United States Patent
Silver

[19]

[11] Patent Number: 6,005,709

[45] Date of Patent: Dec. 21, 1999

[54] MICROSCOPE SYSTEM FOR USING TRANSMITTED LIGHT TO OBSERVE LIVING ORGANISMS

[75] Inventor: Robert B. Silver, Woods Hole, Mass.

[73] Assignee: Marine Biological Laboratory, Woods Hole, Mass.

[21] Appl. No.: 08/658,285

[22] Filed: Jun. 5, 1996

[51] Int. Cl.[6] .................................................. G02B 21/00
[52] U.S. Cl. ...................... 359/368; 359/371; 359/372; 359/386
[58] Field of Search ........................ 359/363, 368, 359/369, 370, 371, 377, 386, 434

[56] References Cited

U.S. PATENT DOCUMENTS

| | | | |
|---|---|---|---|
| 2,601,175 | 6/1952 | Smith ....................................... | 359/371 |
| 4,364,629 | 12/1982 | Lang et al. .............................. | 359/377 |
| 4,518,231 | 5/1985 | Muchel et al. .......................... | 359/377 |
| 4,700,071 | 10/1987 | Mori et al. ............................... | 250/582 |
| 4,720,191 | 1/1988 | Siegel et al. ............................. | 356/237 |
| 4,786,154 | 11/1988 | Fantone et al. .......................... | 359/369 |
| 4,964,707 | 10/1990 | Hayashi .................................. | 359/371 |
| 5,295,477 | 3/1994 | Janfaza ........................................ | 126/6 |
| 5,371,624 | 12/1994 | Nagano et al. ........................ | 359/389 |
| 5,522,789 | 6/1996 | Takahashi ............................... | 600/166 |
| 5,572,359 | 11/1996 | Otaki et al. ............................. | 359/386 |

FOREIGN PATENT DOCUMENTS

| | | | |
|---|---|---|---|
| 0097910 | 4/1990 | Japan ..................................... | 359/368 |

*Primary Examiner*—Cassandra Spyrou
*Assistant Examiner*—Mark A. Robinson
*Attorney, Agent, or Firm*—Hale and Dorr LLP

[57] ABSTRACT

Microscope systems invention provide ability to image specimens, including specimens within living bodies, by imaging with transmitted light rather than solely with reflected light. The microscope systems may be general purpose instruments, or can be custom designed for a particular specimen.

20 Claims, 7 Drawing Sheets

MICROSCOPE SYSTEM FOR USING TRANSMITTED LIGHT TO OBSERVE LIVING ORGANISMS

FIELD OF THE INVENTION

The present invention relates to a microscope system and to methods for viewing biological specimens.

BACKGROUND OF THE INVENTION

To observe living tissues or organs in living bodies that are too large to be put on a slide under a microscope, an endoscope or a laparoscope can be inserted through an existing cavity or through a small incision in the living body. Laparoscopes are currently used to provide surgeons with vision needed to perform minimally invasive surgery, such as removing a gall bladder or an appendix. For such surgery, a laparoscope is inserted through a first small incision while surgery, such as an appendectomy, is performed through a second small incision.

Both endoscopes and laparoscopes provide a beam of light and receive light reflected from an observed area to form an image that is provided on a video monitor. While such reflected light can provide a surgeon, scientist, or other user with vision of the specimen under observation, the image provides little macroscopic or microscopic information about the integral composition or properties of the specimen itself.

SUMMARY OF THE INVENTION

The microscope systems of the present invention provide improved ability to image specimens, including specimens within living bodies, by imaging with transmitted light rather than solely with reflected light. The microscope systems may be general purpose instruments for making observations within different living organism, or it may be custom designed for a particular specimen.

In one aspect, a microscope system has a polarizer, a first prism for receiving polarized light form the polarizer, a condenser lens, an objective lens, and a second prism for receiving light from the objective lens. The condenser lens and the objective lens are substantially identical in composition, focal length, numerical apertures, and merit functions. The microscope system preferably also has extenders between the objective lens and/or the condenser lens and the specimen. The extender receives an image and provides an image substantially similar to the received image at a spaced location.

In another aspect, the invention includes a microscope system with a first optical system on one side of a specimen for transmitting light, and a second optical system for receiving light transmitted through the specimen, with the first and second optical systems at least partially within a living organism.

The microscope system preferably also has a light source, a bandpass attenuator that receives light from the light source, an optical system that provides light from the bandpass attenuator to a specimen and receives light from the specimen, and a feedback network for controlling the wavelength of light provided by the light source and the bandpass of light provided by the bandpass attenuator.

The present invention also includes a method for observing a specimen within a living organism with a microscope system. The method includes steps of positioning a first optical system on one side of the specimen to provide light to the specimen, and positioning a second optical system on an opposite side of the specimen to receive light transmitted through the specimen and to provide an image of the specimen, with the first and second optical systems being positioned to be at least partially enclosed within the living organism.

Many variations on these microscope systems can be employed, including bidirectional observation stereoscopic observations, and observations of a fluorescent specimen.

By using transmitted light as opposed to reflected light, the signal to noise ratio of the optical signal is improved, particularly for objects with low contrast. Moreover, some of the specimen's properties, such as refractive indices, can be determined with transmitted light. Other features and advantages will become apparent from the following detailed description, the drawings, and the claims.

DETAILED DESCRIPTION

Figure 1:
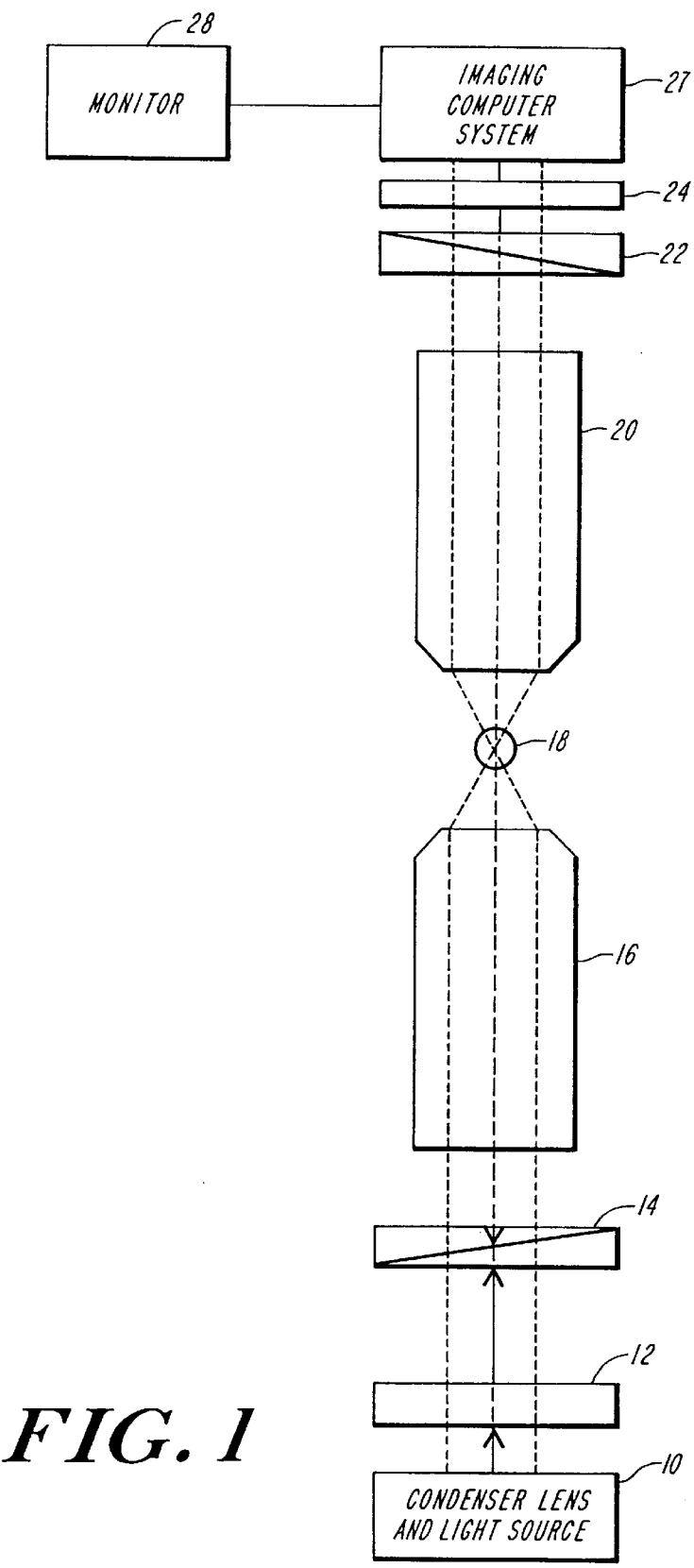
FIGS. 1–4 are pictorial block diagrams of microscope systems according to embodiments of the present invention.

FIG. 1 is a pictorial block diagram of a configuration of a microscope system according to an embodiment of the present invention. This illustrated system uses differential interference contrast (DIC) for imaging.

Light is provided from a light source 10 to a polarizer 12 that provides polarized light to a first Wollaston prism 14. A Wollaston prism is typically made of calcite or quartz and has two pieces that cause an incoming ray to be deviated into two oppositely linearly polarized beams with some angular separation between them. The beams exiting Wollaston prism 14 are collected by a condenser lens 16 and are projected onto a specimen 18. Light transmitted through specimen 18 is then provided to an objective lens 20, a second Wollaston prism 22, and an analyzer 24. From analyzer 24, data can be provided to an imaging computer system 27 for storing data and for providing images on a moniter 28. Prisms 14, 22 are adjustable and are inverted relative to each other. The analyzer can be oriented in one of a number of ways for obtaining images of the specimen.

These components are generally known and have been used together in this manner in DIC microscopes. In such known microscopes, the condenser lens is typically spaced a relatively large distance from the specimen and has a relatively large exit aperture, while the objective lens is relatively close to the specimen and has a relatively small entrance aperture. Many devices have multiple objective lenses and a condenser lens designed to be usable with all of the different objective lenses.

In the microscope system of the present invention, condenser lens 16 and objective lens 20 are substantially identical to each other. Moreover, in the embodiment of FIG. 1, these lenses are also an equal distance from specimen 18, but on opposite sides of the specimen so that the objective lens receives transmitted light. The substantial identity of these lenses preferably exists in terms of composition, focal length, numerical aperture, and merit functions (i.e., point spread, line spread, and modulation transfer). The identity of the lenses and the equal distance serve to substantially reduce or even cancel out aberrations and noise patterns in the transmitted light.

Figure 2:
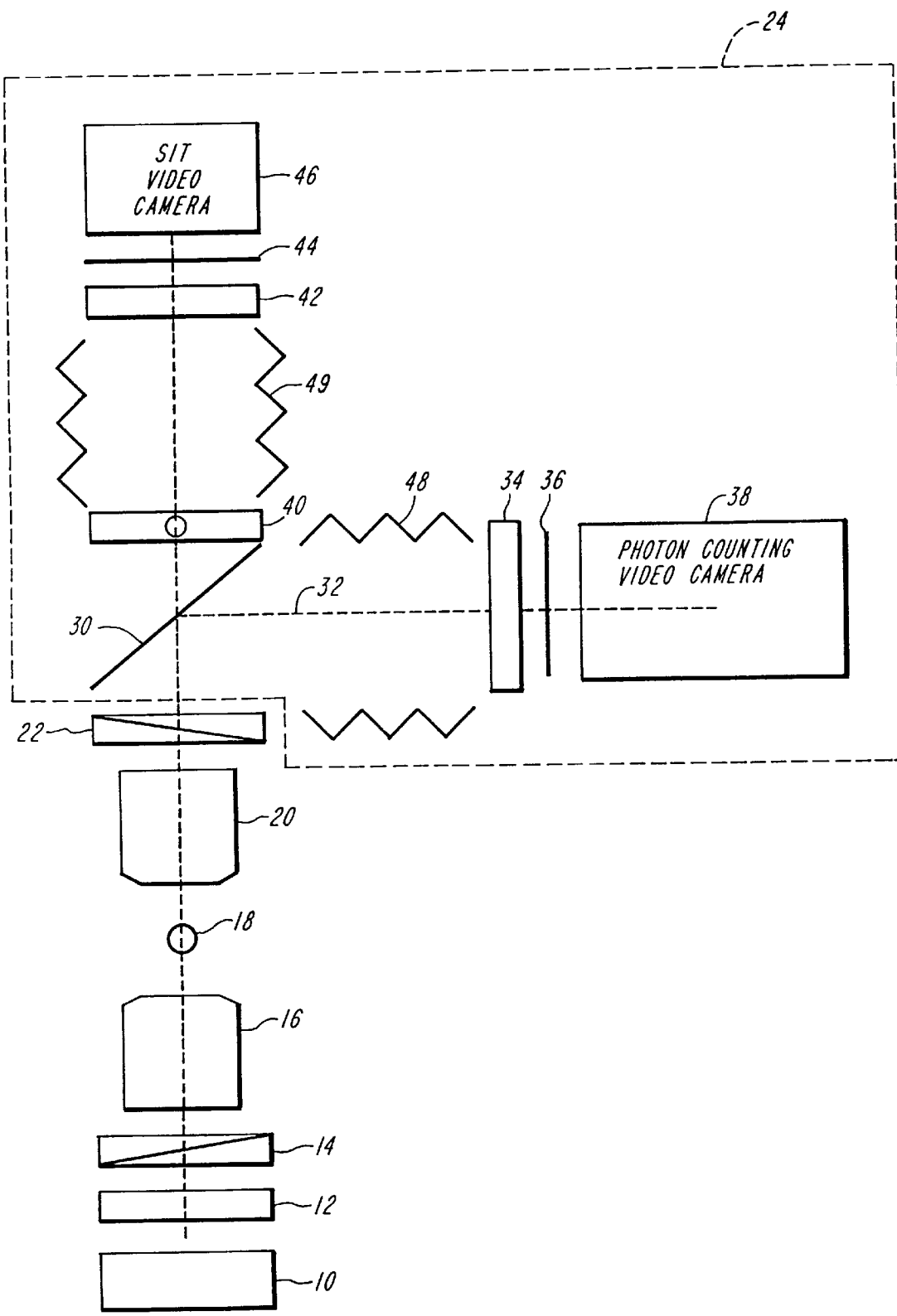

Referring also to FIG. 2, this microscope system can be used in connection with an imaging system as described in application Ser No. 08/618,246, filed Mar. 18, 1996, entitled "Analytical Imaging System and Process," which is expressly incorporated herein by reference for all purposes. With such a system, analyzer 24 includes a beam splitter 30, which provides a high energy light beam 32 to an analyzer 34 for low wavelength light and then to a tuned bandpass attenuation filter 36. The resulting light is received by a photon counting video camera 38. Beam splitter 30 also provides a beam to a beam input port 40, an analyzer 42 for high wavelength light, a tuned bandpass attenuation filter 44, and an SIT video camera 46. The signals received from cameras 38, 46 can be recorded, processed, and compared to each other and to prior images to analyze and display signals from each camera. This system allows the analysis of visual images to be correlated with images observing photons at a specific wavelength.

Each of the high and low energy light beams passes through a set of bellows 48, 49. These bellows can be adjusted to compensate for the geometry of the system, and to prevent stray light from being sensed by cameras 38, 46.

Figure 3:
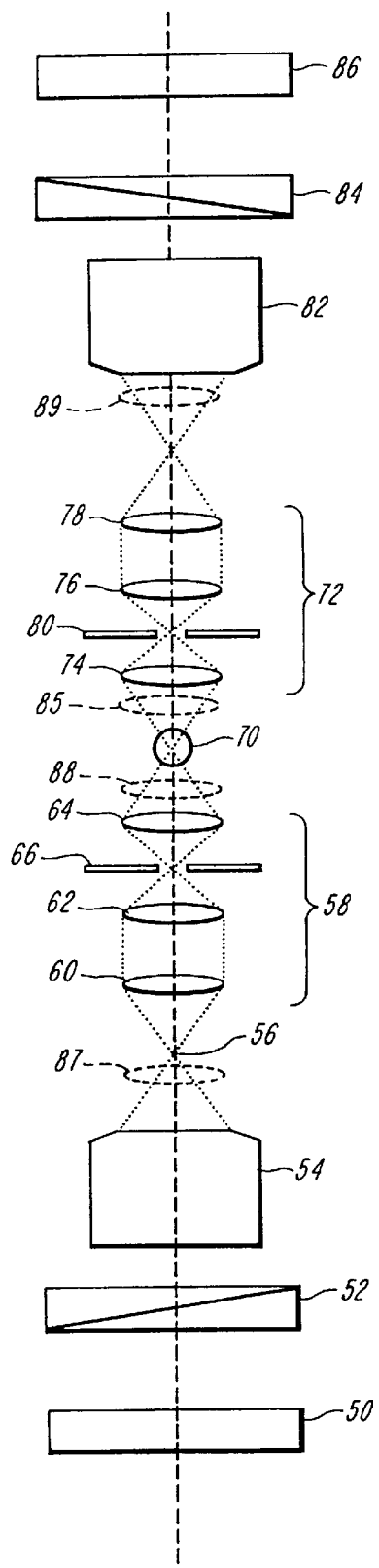

Referring to FIG. 3, the microscope system of FIG. 1 can be used for imaging within a living body by sensing transmitted light through a specimen. To accomplish this, a microscope system such as that in FIG. 1 is preferably modified so that it has light extenders between the specimen and the objective and/or condenser lens. These extenders make it easier for the optics of the system to be effectively positioned at the specimen without requiring that the objective lens and/or condenser lens be inserted in the living body.

As in the embodiment of FIG. 1, light is provided to a polarizer 50, a first Wollaston prism 52, and a condenser lens 54. After focal plane 56 of condenser lens 54, a first extender 58 receives a light image from condenser lens 54 and provides a substantially similar light image some distance away. Extender 58 has a first element 60, an intermediate element 62, and a front element 64, and also a zero order beam stop 66 between intermediate element 62 and front element 64. Stop 66 is an adjustable diaphragm that can be used to block the zero order and to filter out other spatial information to eliminate some scattering of light.

Light is provided from front element 64 of extender 58 to specimen 70. The transmitted light is then received by a second extender 72, which has a front element 74, an intermediate element 76, and a first element 78, and also a zero order beam stop 80 between front element 74 and intermediate element 76. The resulting light from extender 72 is provided to an objective lens 82, a Wollaston prism 84, and an analyzer 86.

Each extender 58, 72 is designed so that the image that is received at one end is essentially reproduced at the other end some distance away from the one end. Accordingly, the light image from condenser lens 54 at position 87 should be substantially the same as the image at position 88 between front element 64 and specimen 70. Similarly, extender 72 causes the image at position 85 to be substantially the same as the image at position 89 (and thereafter provided to objective lens 82).

When imaging in a living organism, it may be useful for condenser lens 54 and/or objective lens 82 to be outside the body, and consequently some form of extension is useful for extending into the body. In this case extensions 58 and 72 would be located within and thus be substantially surrounded by the body, while the condenser lens, objective lens, Wollaston prism, and other parts of the microscope system can be outside the body.

Alternatively, only one extender can be provided between the specimen on either the condenser lens or the objective lens. Only one extender may be needed if the specimen is near the outside of the body, such that extension is only needed on one side.

As discussed in conjunction with FIG. 1, the materials used and relative distances are preferably symmetric throughout the microscope system. Accordingly, lenses 54 and 82 are preferably substantially identical in the composition, focal length, numerical aperture, and merit functions as noted above. Moreover, for each extension used, first elements 60, 78 are preferably set at a fixed and equal distance from condenser lens 54 and objective lens 82, respectively. Front elements 64 and 74 are also preferably kept at an equal distance on opposite sides of specimen 70. Because the microscope system and the subject specimen may move within the living organism, the positions of extenders 58, 72 on either side of specimen 70 are preferably movable. The system can be moved either under human operator control or under computer system control, with a computer system (such as that shown in FIG. 1) designed to adjust position through feedback to maintain maximum contrast at edges or to maintain maximum intensity of the signal.

Figure 9A:
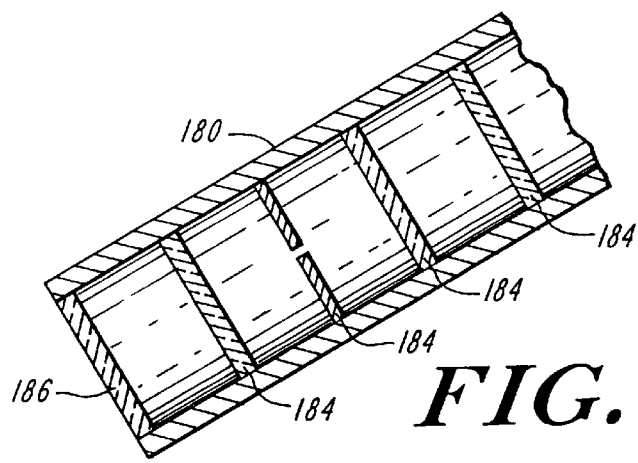
FIGS. 9(a) and 9(b) are cross-sectional views of alternate arrangements for holding optical elements within a living body.
Figure 9B:
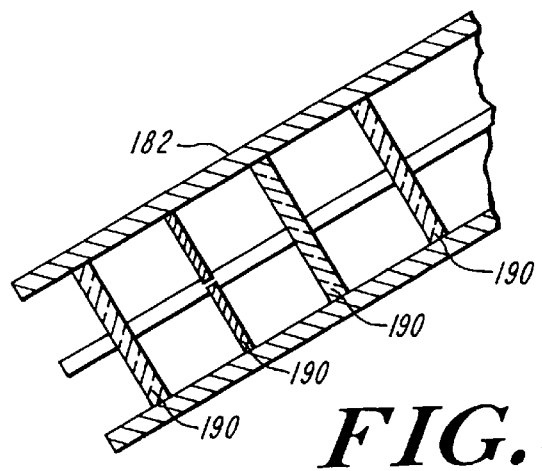

With this embodiment, to observe a specimen within a living organism, extenders 58, 72 are inserted from either side of the body for observing the specimens. Referring to FIGS. 9(a) and 9(b), to allow such insertion into a body, the components that make up the extenders can be held within a solid tube 180 (FIG. 9(a)) or within an otherwise open frame structure 182 (FIG. 9(b)) that has supports for the lenses and stop(s). In FIG. 9(a), tube 180 supports optical elements 184 and has a transparent end 186 for allowing light to pass through. Tube 180 would typically be sealed from the immediate environment and filled with a gas, such as air or air with an inert gas such as dry nitrogen or argon. In FIG. 9(b), the support for optical elements 190 is an otherwise open frame structure 182. Consequently, spaces between elements 190 are not sealed and are filled by the surrounding fluid, whether that fluid is liquid or gaseous.

In this embodiment (and in other embodiments illustrated herein), certain optical elements are shown as biconvex lenses. These elements could be other optical elements, such as compound lenses, binary lenses, spherical lenses, aspheric lenses, holographic lenses, or gradient index lenses, singly or in combination.

Figure 4:
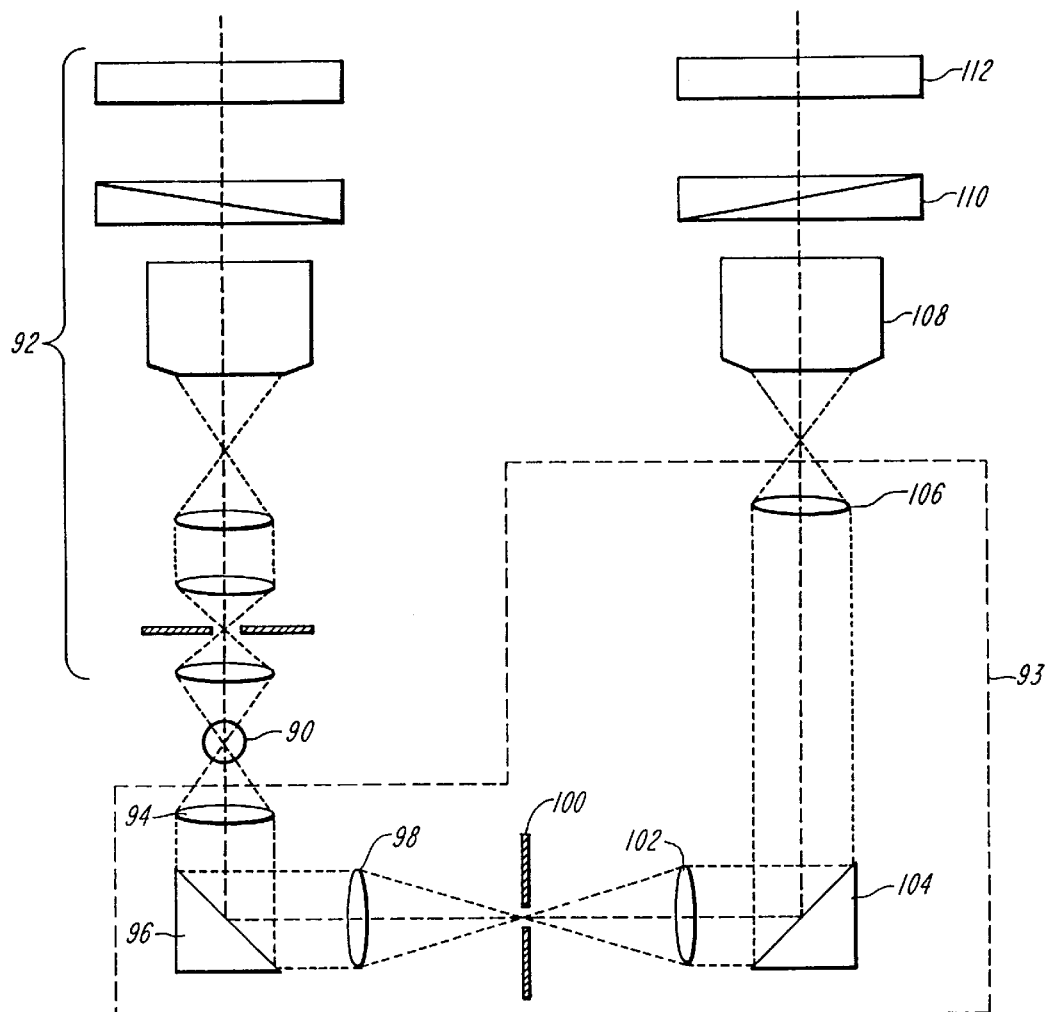

As shown in FIG. 3, if the microscope system is used in a body (and it need not be), two separate parts of the microscope system are shown entirely on opposite sides of the specimen. Referring to FIG. 4, in another embodiment of the present invention, additional element, particularly mirrors are provided to "fold" the optical path so that transmission and reception of light are done from one side of the specimen. Such folding thus allows all components to be inserted through a single opening or a single incision.

In this embodiment, a specimen 90 is illuminated by a first optical system 92 that is generally similar to the components from polarizer 50 to first element 64 in the embodiment of FIG. 3. The light transmitted through specimen 90 is provided to an extender 93 that includes a front element 94, a first mirror 96, a first intermediate lens 98, a zero stop 100, a second intermediate lens 102, a second mirror 104, and a rear element 106. A condenser lens 108, Wollaston prism 110, and analyzer 112 may be similar to those shown in prior embodiments. Each of the mirrors is preferably a first surface mirror, meaning that the image is reflected at its first surface (as opposed to a second surface mirror, such as common household mirror, in which reflection occurs at a rear surface of a pane of glass).

As in previous embodiments, it is preferable for the objective lens and condenser lens to be substantially identical to each other in composition, focal length, numerical aperture, and merit functions; for the extenders to be mounted to some form of frame, such as a tube or an open frame structure; and for the elements of the extenders to be configured to be an equal distance from a nearby lens. The tube or frame in this case would also hold the mirrors.

Because the optical axis effectively reverses direction, a transmitter and a receiver can be mounted adjacent each other, and thus transmitted light as opposed to reflective light can be used to view an object in situ, preferably by inserting the optical elements into a single cavity or incision. Transmitted light can be useful because it can be used to determine properties of the specimen itself.

Figure 5:
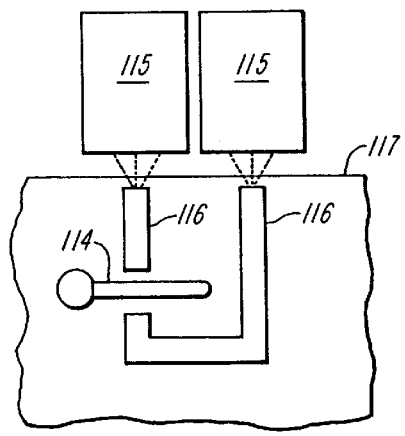
FIGS. 5–6 are pictorial representations of a microscope system in three exemplary situations.
Figure 6:
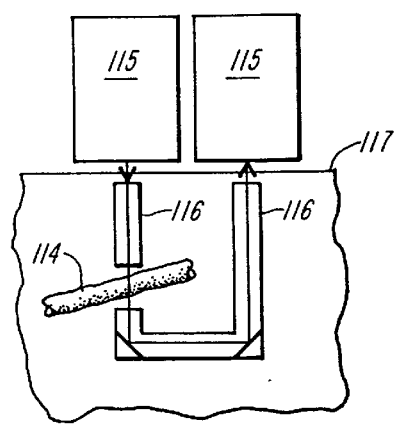

Referring to FIGS. 5–6, examples of the use of such microscope systems are illustrated in a general form. Referring to FIG. 5, in one exemplary use of the present invention for research purposes, the microscope system (particularly that of FIG. 4) is used to observe vestibular sensory hair cell stereocilia during motion in situ in a toadfish. By recording and analyzing such stereociliary motion, attempts can be made to correlate this motion with other physiological analyses of the toadfish.

Referring to FIG. 6, in an exemplary medical application, a small specimen, such as a blood vessel or a tumor within a colon, can be observed. In addition to observing such specimens in a natural state, the specimens can be observed while undergoing treatment or during some particular activity. For example, a tumor can be observed in situ during radiation treatment, with radiation received from an external source or from an implant.

These examples are illustrated in a general way with a specimen 114, external optical systems 115, and internal optical systems 116 within a body 117. While the internal and external systems can be varied in the sense of what element goes where, in one embodiment noted above, the objective lens and condenser lens are external while the extenders are internal.

While certain specific examples are described here, it should be apparent that the microscope system of the present invention has very broad applicability for observing other types of specimens, for use under a variety of conditions, and for performing a variety of experiments. Moreover, the system can be custom-designed for a particular observation or use, or it can be designed for general use, such as for laparoscopic surgery. Some embodiments may also be useful outside a body under study, i.e., for study of a specimen on a slide.

Figure 7:
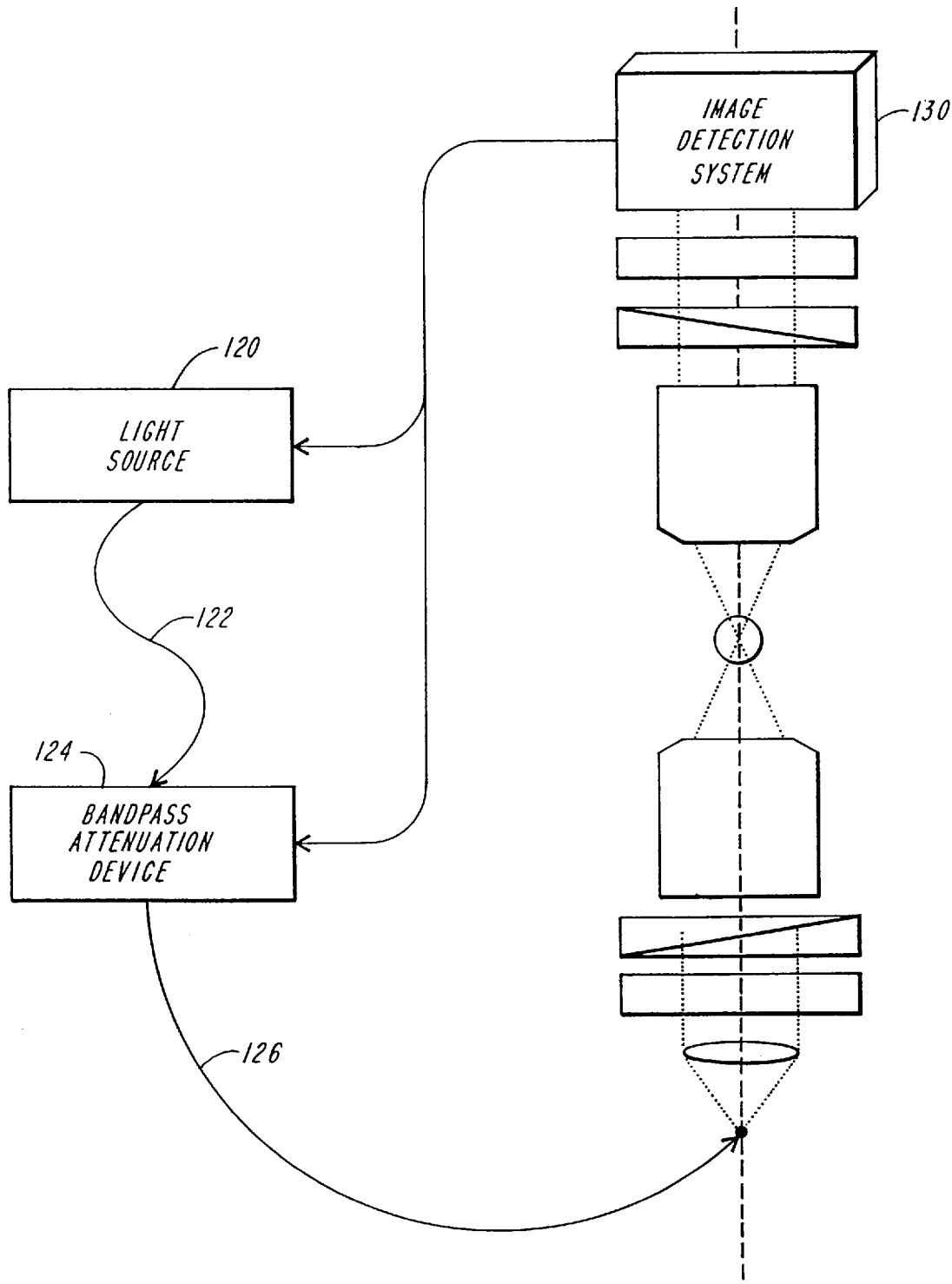
FIG. 7 is a pictorial block diagram of a microscope system with a tunable point source.

Referring to FIG. 7, different types of light sources can be used with such a microscope system. One type that provides certain benefits includes a broadband light source 120 that provides light through a fiber optic line 122 to a bandpass attenuation device 124. Device 124 provides controlled light over a fiber optic line 126 to a microscope system, such as those systems shown in FIGS. 1–4. The resulting image is received by an image detection system 130 which can include a programmed computer system. System 130 provides feedback to light source 120 and to device 124 to control the light input provided through fiber optic line 126.

Light source 120 is preferably an ORC Illuminator Model 6000, a broadband 300 watt xenon light source whose output intensity is variable in response to the feedback signal from system 130. White light from such a device can be controlled with feedback to maintain constant intensity. Such a device has been used in the surgical environment to control the light level.

Attenuation device 124 many be implemented as a monochrometer with a slit unit of a Beckman Model DU spectrophotometer. Alternatively, this attenuation device could be provided as an acousto-optical bandpass attenuator, i.e., a multichroic filter whose bandpass is determined by the frequency of energy passed through a crystal through which light passes from the illuminator to the target; a color compensation filter; a neutral density filter; or another device that adjusts bandpass and intensity of illumination light.

The attenuation device allows the user to select a desired bandpass, while the broadband source allows the user to select a desired wavelength and intensity. These parameters can be controlled by feedback from image detection system 130 to maximize the signal to noise ratio or some other desired parameter.

Figure 8:
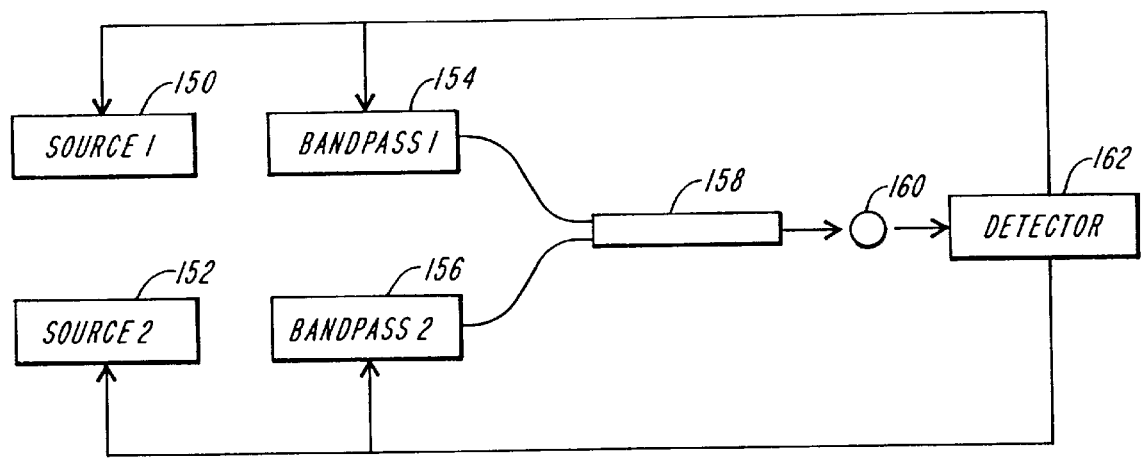
FIG. 8 is a block diagram of a dual light source system.

Referring to FIG. 8, multiple sources and/or attenuation devices can be used. Two separate sources 150, 152 and two separate respective attenuators 154, 156 provide light over a single fiber 158 for transmission to the microscope system with a specimen 160, and then to a detector 162. This system, preferably with appropriate feedback from detector 162, can be used to alternately or simultaneously provide to a specimen light with different bandpasses to allow different types of observation.

Figure 10:
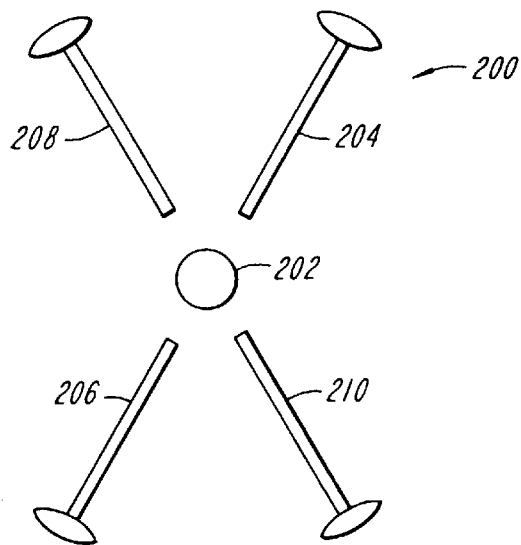
FIGS. 10–12 are pictorial side views of additional embodiments of the present invention.
Figure 11:
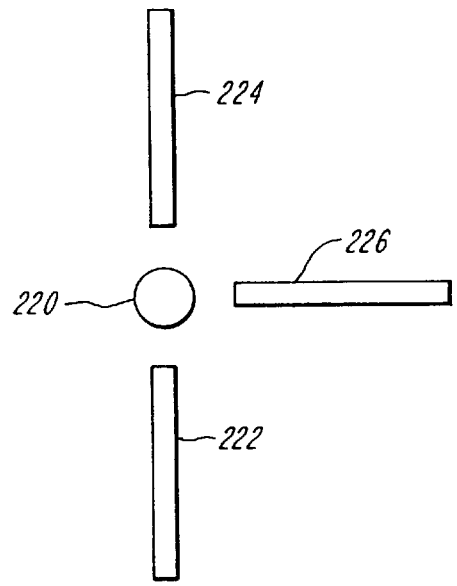
Figure 12:
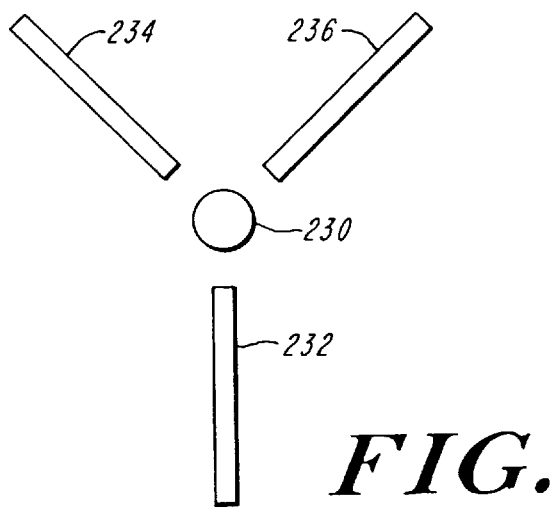

FIGS. 10–12 generally illustrate other arrangements of sources, optical systems for providing light and optical systems for receiving light. Referring to FIG. 10, in another embodiment of the present invention, a system 200 for observing a specimen 202 has two sets of optical systems with extenders oriented pairwise. In one embodiment, an optical system with extender 204 provides light to specimen 202, and the transmitted light is sensed by an optical system with extender 206. Simultaneously or alternately, an optical system with extender 210 provides light to specimen 202 and that light is received by an optical system with extender 208. Thus, the system in this embodiment is bi-directional. While the extenders are shown here in an x-shaped configuration, the angle between the optical axes could be varied and could be parallel on each side of the specimen.

Referring to FIG. 11, the system can be used to collect light from a fluorescent specimen 220. An optical system with an extender 222 provides light to specimen 220, and that transmitted light is received on the other side of the specimen with an optical system including an extender 224. Excitation energy for observing the fluorescent specimen can be provided with an illuminator 226 that is perpendicular to the optical axis of extenders 222 and 224, or it could instead be adjacent and parallel to extender 222 (not shown). As an example of such use of a fluorescent specimen, fluorescent latex microbeads with a small diameter (e.g., less than one micron), can be inserted into the blood stream to follow blood flow in small vessels. In this case, the fluorescence is used to observe the flow and movement of the blood.

Referring to FIG. 12, in another embodiment, a specimen 230 can be observed in such a way that stereoscopic vision is provided. In this case, an optical system with an extender 232 provides light to specimen 230, and transmitted light is received by optical systems with extenders 234 and 236.

These optical systems that include extenders 234 and 236 can be designed to alternate colors, such as red and green. With appropriate computer processing, one could see the specimen in a three-dimensional manner with red-green glasses. The video image can also be collected and displayed with a method consistent with the use of other display devices such as Z-screen and/or CrystalEyes stereo viewing systems, available from StereoGraphics Corp., of San Raphael, Calif. CrystalEyes eyewear, for example, is a set of glasses that one uses to see computer or video-generated images in three-dimensional stereo depth. Moreover, the image could be. displayed holographically and be apparent in space.

In many of the embodiments described above, the specimen can be manipulated during observation, for example, with laser scissors or laser tweezers using methods of manipulation that are generally known in the field of biological analysis. These manipulations allow analysis in response to such a stimulus.

Having described embodiments of the present invention, it should be apparent that other modifications can be made without departing from the scope of the appended claims. While the description above primarily discusses use of differential interference contrast optics, many of the principles can be applied to brightfield optics. While the microscope systems have been discussed for use with transmitted light only, the systems of the present invention could be used in conjunction with a system for receiving and imaging with reflected light.

What is claimed is:

1. A method for observing a specimen within a living organism, the method comprising steps of:

positioning a first optical system on one side of the specimen to provide light to the specimen; and positioning a second optical system on an opposite side of the specimen to receive light transmitted through the specimen and to provide an image of the specimen;

the positioning steps being performed so that the first and second optical systems are at least partially enclosed within the living organism.

2. The method of claim 1, wherein the first optical system includes an extender with a first optical element and a last optical element.

3. The method of claim 2, wherein the extender is constructed so that an image received at the first optical element is substantially reproduced a distance from the last optical element.

4. The method of claim 1, wherein the first optical system includes a condenser lens outside the living organism and an extender within the living organism.

5. The method of claim 1, wherein both positioning steps including inserting optical systems through a single opening in the living organism.

6. The method of claim 5, wherein the first optical system includes a light source, a first optical extender for receiving light from the light source, and a condenser lens for providing light from the light source to the extender, and wherein the second optical system includes a second extender for receiving light transmitted through the specimen, and an objective lens for receiving light from the second optical extender.

7. The method of claim 6, wherein one of the first and second extenders is mounted in an open frame.

8. The method of claim 6, wherein the specimen is fluorescent, the method further including providing a source for providing excitation energy to the specimen.

9. The method of claim 6, further comprising providing a second objective lens and a third extender for providing light to the second objective lens.

10. The method of claim 6, wherein the light source includes a source having variable intensity and an attenuator for controlling the bandpass of the light, the method further comprising detecting light received from the second prism and providing a signal along a feedback path to the source and to the attenuator to control the source and attenuator.

11. The method of claim 10, wherein the attenuator includes a monochrometer and the light source includes a broadband source.

12. The method of claim 1, wherein the first optical system includes:

a light source;

a polarizer for receiving light from the light source;

a first prism for receiving polarized light from the polarizer; and a condenser lens for providing light from the prism to the specimen;

and wherein the second optical system includes:

an objective lens for receiving light transmitted through the specimen; and a second prism for receiving light from the objective lens;

wherein the condenser lens and objective lens are substantially identical in composition, focal length, numerical aperture, and merit functions.

13. The method of claim 12, further comprising a first extender between one of the objective and condenser lenses and the specimen, the first extender receiving an input image and providing an output image that is substantially similar to the received input image.

14. The method of claim 13, further comprising a second extender between the other of the condenser and objective lenses and the specimen, the second extender receiving an input image and providing an output image that is substantially similar to the received input image.

15. The method of claim 13, further comprising a closed tube for holding the extender.

16. The method of claim 13, further comprising an open frame structure for holding the extender.

17. The method of claim 12, further comprising an analyzer including a beam splitter for splitting received light into first and second beams, a first camera for receiving the first beam, and a second camera for receiving the second beam.

18. The method of claim 12, wherein the first prism and condenser lens are on one side of the specimen, the system further including an extender that receives light transmitted through the specimen, and an optical system that receives the transmitted light and causes it to be transmitted parallel to the received light.

19. The method of claim 12, wherein the light source includes a source having variable intensity and an attenuator for controlling the bandpass of the light, the system further comprising a detector for receiving light from the second prism and a feedback path from the detector to the source and to the attenuator to control the source and attenuator.

20. The method of claim 1, wherein positioning a first optical system includes positioning a condenser lens, and positioning a second optical system includes providing an optical system with at least two mirrors and an objective lens such that a first beam path from the condenser lens to the specimen is parallel to a second beam path form one of the mirrors to the objective lens.

* * * * *